United States Patent Office 3,303,943
Patented Feb. 14, 1967

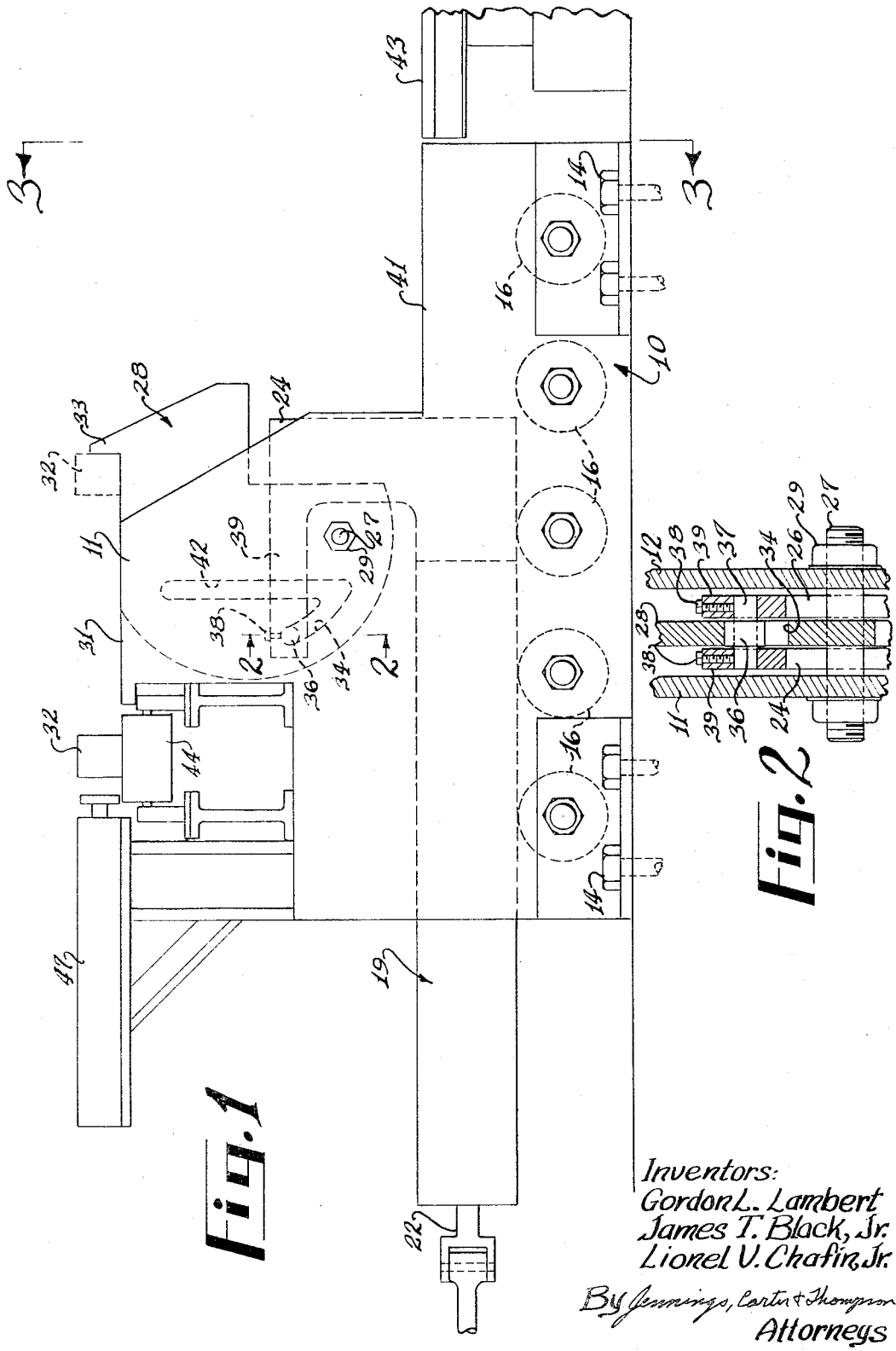

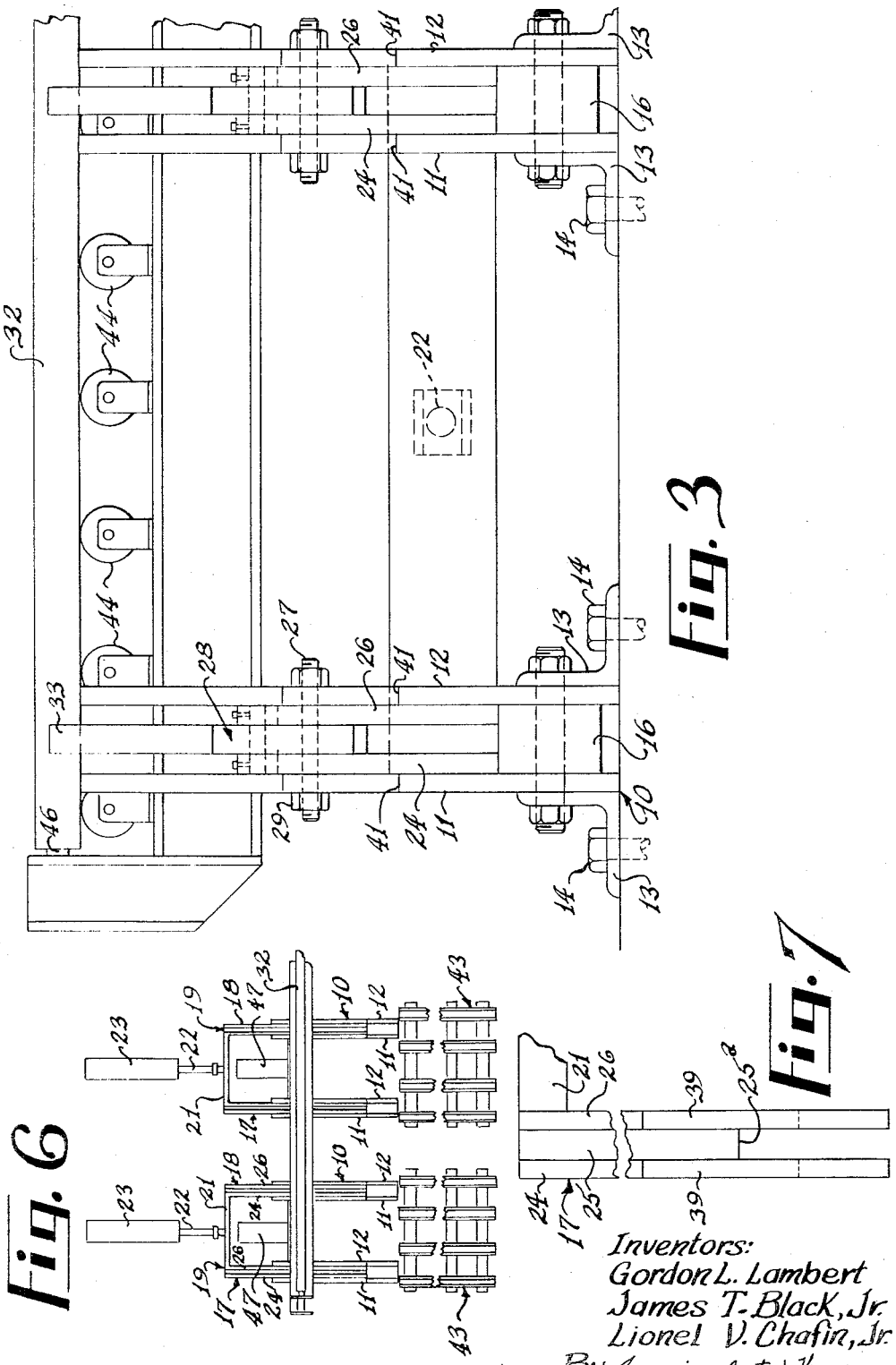

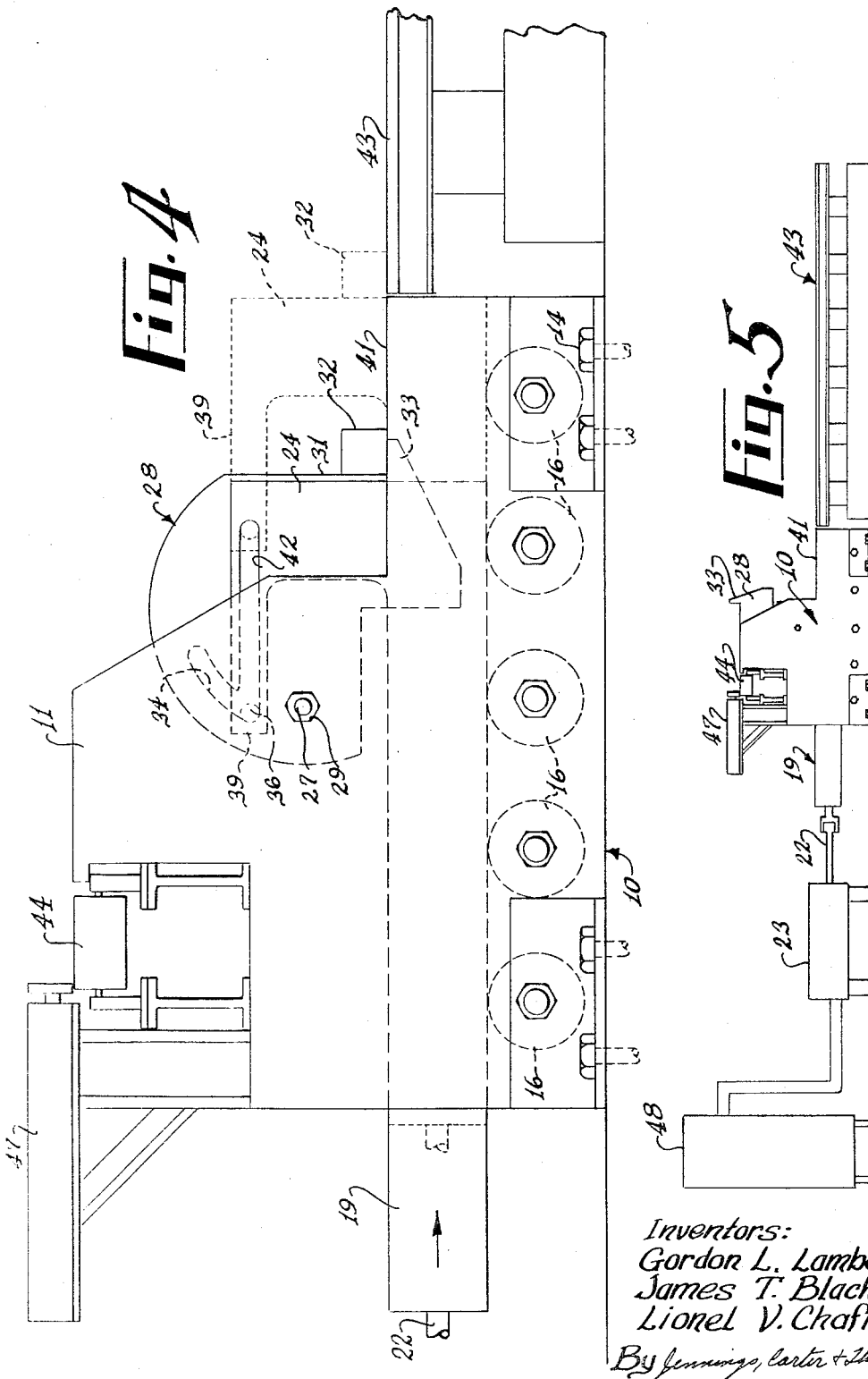

3,303,943
APPARATUS FOR TRANSFERRING ARTICLES FROM ONE LOCATION TO ANOTHER LOCATION
Gordon L. Lambert, James T. Black, Jr., and Lionel V. Chafin, Jr., Birmingham, Ala., assignors to H. K. Porter Company, Inc., a corporation of Delaware
Filed Jan. 18, 1965, Ser. No. 426,344
9 Claims. (Cl. 214—6)

This invention relates to apparatus for transferring articles from one location to another location and more particularly to apparatus for transferring articles, such as elongated steel billets from one supporting surface onto another supporting surface.

An object of our invention is to provide apparatus in which one or more articles are successively transferred from a first supporting surface to a second supporting surface and then moved onto a support member, such as a pallet, or the like.

Another object of our invention is to provide apparatus of the character designated wherein a stack of articles may be transferred as a unit from one position to another position and then moved as a unit onto a support therefor whereby the articles may be stacked in stacks of predetermined heights.

A further object of our invention is to provide apparatus of the character designated in which the articles to be transferred are first positioned on one supporting surface and then rotary motion is imparted to that supporting surface whereby the articles are stacked on another supporting surface for movement onto a support member.

A still further object of our invention is to provide apparatus of the character designated which shall be simple of construction, economical of manufacture and one which may be operated manually or automatically to transfer articles, such as steel billets successively from a moving conveyor onto a support member.

Briefly, our improved apparatus comprises a pair of transversely spaced movable members mounted for pivotal movement on a frame. Each movable member is provided with a supporting surface whereby the articles to be transferred are supported between the movable members. Means is provided for rotating the movable members from a first position to a second position whereby the articles positioned on the supporting surface are stacked onto a second supporting surface and then transferred onto a support member. An outwardly projecting support member is carried by each of the movable members in position to engage the articles as the movable members move from one position to another position.

Apparatus embodying features of our invention is illustrated in the accompanying drawings, forming a part of this application, in which:

FIG. 1 is a side elevational view, partly broken away, showing the apparatus in position to receive articles to be transferred;

FIG. 2 is an enlarged, sectional view taken generally along the line 2—2 of FIG. 1;

FIG. 3 is a front elevational view, partly broken away, taken generally along the line 3—3 of FIG. 1;

FIG. 4 is a side elevational view showing the position of the apparatus after the article has been transferred onto a second supporting surface and thence onto a support member;

FIG. 5 is a side elevational view, drawn to a smaller scale, showing the apparatus and the control mechanism therefor;

FIG. 6 is a top plan view also drawn to a smaller scale and showing two units mounted in transversely spaced relation to each other for handling relatively long articles; and, FIG. 7 is a fragmental plan view showing one leg of the actuating member removed from the remainder of the apparatus.

Referring now to the drawings for a better understanding of our invention, we show a supporting frame 10 having a pair of laterally spaced vertical plates 11 and 12 adjacent opposite sides thereof. The lower ends of the vertical plates 11 and 12 are secured to a subjacent supporting surface by suitable brackets 13 and bolts 14.

Mounted for rotation between the pairs of vertical plates 11 and 12 adjacent the lower portion of the frame 10 are a series of longitudinally spaced rollers 16. Supported by the rollers 16 inwardly of the vertical plates 11 and 12 are forwardly extending legs 17 and 18 of a generally U-shaped actuating member indicated generally at 19. As shown in FIG. 6, the actuating member is provided with a base member 21 which is connected to a piston 22 of a fluid pressure operated cylinder 23 whereby the actuating member may be moved relative to the vertical plates 11 and 12. As shown in FIGS. 3, 6 and 7 each leg 17 and 18 of the U-shaped actuating member 19 comprises a pair of forwardly extending members 24 and 26 which are spaced from each other by a spacer member 25 that terminates as at 25a inwardly of the forward end of the members 24 and 26, as shown in FIG. 7. Mounted for pivotal movement between each pair of members 24 and 26 forwardly of the spacer member 25, by means of a pivot pin 27, is a movable member 28 which is adapted to move from the position shown in FIG. 1 to the position shown in FIG. 4. Each pivot pin 27 extends through the vertical plates 11 and 12 and the vertical members 24–26 associated therewith and is secured in place by suitable retaining nuts 29.

As shown in FIG. 1 each movable member 28 is provided with a supporting surface 31 in position to receive the article or articles to be transferred, such as an elongated steel billet 32. Each movable member 28 is provided with an outwardly projecting supporting member 33 which extends generally perpendicular to the supporting surface 31 whereby the billet 32 is supported as it moves from the position shown in FIG. 1 to the position shown in FIG. 4.

Each movable member 28 is provided with a cam follower groove 34 which is in position to receive a cam driving member 36. As shown in FIG. 2, the cam driving member 36 is in the form of a roller mounted for rotation on a shaft 37 which in turn is secured by suitable set screws 38 to rearwardly extending members 39 carried by the forwardly extending members 24 and 26 of the actuating member 19. It will thus be seen that upon forward movement of the actuating member 19, the cam driving member 36 engages the cam follower groove 34 to thus rotate the movable member 28 in a clockwise direction, as viewed in FIGS. 1 and 4. As shown in FIGS. 1, 3 and 4, the vertical plates 11 and 12 are provided with forwardly extending portions which define supporting surfaces 41 for receiving the billets 32 as they are moved to the solid line position shown in FIG. 4.

As shown in FIGS. 1 and 4, each movable member 28 is provided with a rectilinear groove 42 which communicates at one end thereof with the cam follower groove 34. The rectilinear groove 42 is in position to receive the cam driving member 36 after the cam driving member has moved the movable member 28 from the position shown in FIG. 1 to the position shown in FIG. 4. Upon continued forward movement of the actuating member 19 and the cam driving member 36, the cam driving member moves in a straight line for a predetermined distance without further rotation of the movable member 28. Accordingly, the forward edges of the members 24 and 26 engage the billet 32 to move the same from the solid line position shown in FIG. 4 to the dotted line position whereby the billet is supported on a support member indicated generally at 43.

The articles to be transferred, such as the billets 32, are conveyed alongside the rear portion of the movable members 28 as shown in FIG. 1, by a roller type conveyor having a plurality of power driven rollers 44. Mounted on the frame 10 in position to be engaged by the advancing end of the billet 32, as shown in FIG. 3, is a switch element 46 that is operatively connected to a pusher unit 47 which is adapted to move the billet 32 from the solid line position on the roller 44, as shown in FIG. 1, to the dotted line position on the movable members 28, shown in FIG. 1. That is, the switch element 46 is operatively connected to a control panel 48 and the pusher unit 47 whereby each time the billet 32 contacts the switch element 46, the pusher unit 47 is energized to move the billet from the conveyor rollers 44 onto the supporting surfaces 31 of the movable members 28. After a predetermined number of the billets 32 have been transferred onto the supporting surfaces 31, the hydraulic cylinder 23 is energized whereupon the actuating member 19 moves forwardly to cause the cam driving members 36 to engage the cam follower grooves 34 and thereby rotate the movable members 28, and thus move the billet from the dotted line position shown in FIG. 1 to the solid line position shown in FIG. 4. Continued movement of the actuating member 19 causes the cam driving members 36 to move in the rectilinear grooves 42 whereupon the forward edges of the vertical members 24 and 26 engage the billet 32 to thus move the billet from the solid line position shown in FIG. 4 to the dotted line position on the member 43.

In FIG. 6 of the drawings, we show two frame members 10 mounted in transversely spaced relation to each other for receiving a relatively long article 32, such as a billet of a length to span both frame members 10 as shown. The hydraulic cylinders 23 are operatively connected to the control panel 48 whereby they are actuated concomitantly to move the actuating members 19 forward as a unit.

From the foregoing description, the operation of our improved apparatus will be readily understood. The articles to be transferred, such as billets 32, are conveyed alongside the rear portion of the movable members 28 by the rollers 44 of the conveyor unit. As each billet 32 reaches its proper position relative to the movable members 28, the switch element 46 is actuated whereupon the pusher unit 47 moves the billet from the conveyor roller 44 onto the supporting surfaces 31. A predetermined number of billets 32 may be positioned on the supporting surfaces 31 prior to operation of the actuating member 19. That is, 1, 2 or more billets 32 may be pushed forward onto the supporting surfaces 31 whereby the forwardmost billet 32 engages the outwardly projecting support members 33. After a predetermined number of the billets have been positioned on the supporting surfaces 31, the control panel 48 is operated either manually or by suitable automatic means whereby the actuating member 19 moves forward to thus cause the cam drive members 36 to engage the cam follower grooves 34 and thus rotate the movable members 28 from the position shown in FIG. 1 to the position shown in FIG. 4 whereupon the billets or billets 32, as the case may be, are supported by the supporting surfaces 41. Continued forward movement of the actuating member 19 by the hydraulic cylinder 23 causes the cam drive members 36 to ride in the rectilinear grooves 42 whereby there is no further rotation of the movable members 28. As the actuating member 19 continues its forward movement, the forward edges of the vertical members 24 and 26 engage the billet or billets, as the case may be, whereby they are moved from the solid line position shown in FIG. 4 to the dotted line position on the member 43. The member 43 is removed by conventional means after the desired number of billets have been stacked thereon.

While we have shown our invention in but one form, it will be obvious to those skilled in the art that it is not so limited but is susceptible of various changes and modifications without departing from the spirit thereof, and we desire, therefore, that only such limitations shall be placed thereupon as are specifically set forth in the appended claims.

What we claim is:

1. In apparatus for transferring articles from a first support to a second support,
    (a) a supporting frame,
    (b) a movable member mounted for pivotal movement on said frame and having a supporting surface in position to receive an article to be transferred from said first support,
    (c) there being a cam follower groove in said movable member,
    (d) a cam driving member within said cam follower groove disposed to move said movable member from a first position to a second position,
    (e) an outwardly projecting support member carried by said movable member in position to support said article as said movable member moves from said first position to said second position,
    (f) another supporting surface carried by said frame in position to support said article after the article is moved to said second position,
    (g) there being a rectilinear groove in said movable member in communication with said cam follower groove for receiving said cam driving member after said cam driving member rotates said movable member to said second position whereby said cam driving member then moves relative to said movable member for a predetermined distance without rotation of said movable member,
    (h) an actuating member operatively connected to said cam driving member for moving the same and disposed to engage and move said article along said another supporting surface from said second position to said second support, and
    (i) means to move said actuating member whereby said cam driving member moves relative to said cam follower groove to rotate said movable member and then travels in said rectilinear groove as the actuating member moves the article from said second position to said second support.

2. In apparatus as defined in claim 1 in which the movable member mounted for pivotal movement on the frame comprises at least one vertical plate having said cam follower groove and said rectilinear groove therein with the rectilinear groove extending generally perpendicular to the supporting surface on said movable member whereby the article is moved in a direction generally perpendicular to said supporting surface as it is transferred from said second position to said second support.

3. In apparatus as defined in claim 1 in which said actuating member is supported for horizontal movement on a plurality of longitudinally spaced rollers.

4. In apparatus as defined in claim 1 in which the portion of said actuating member that engages the article is moved to a position adjacent said article while the article is in said second position whereby continued movement of said actuating member moves said article onto said second support.

5. In apparatus for transferring articles onto a support therefor,
    (a) a supporting frame,
    (b) at least one pair of transversely spaced movable members mounted for pivotal movement on said frame, each having a supporting surface in position to engage an article to be transferred whereby the article is supported between said pair of movable members,
(c) there being a cam follower groove in each of said movable members,
(d) a cam driving member within each of said cam follower grooves disposed to move said movable members from a first position to a second position,
(e) an outwardly projecting support member carried by each of said movable members in position to engage an article as said movable members move from said first position to said second position,
(f) other supporting surfaces carried by said frame in position to support said article after the article is moved to said second position,
(g) there being a rectilinear groove in each movable member in communication with said cam follower groove therein for receiving its associated cam driving member whereby said cam driving members rotate said movable members and then move relative to said movable members for a predetermined distance without rotation of said movable members.
(h) an actuating member operatively connected to both of the cam driving members for moving the same concomitantly and disposed to engage and move said article along said other supporting surfaces from said second position onto said support, and
(i) means to move said actuating member whereby said cam driving members move relative to said cam follower grooves to rotate said movable members and then travel in said rectilinear grooves as the actuating member moves the article from said second position onto said support.

6. In apparatus as defined in claim 5 in which at least two of said pairs of movable members are mounted in transversely spaced relation for supporting concomitantly an article of a length to span both of said pairs of movable members.

7. In apparatus as defined in claim 5 in which a conveyor extends alongside said movable members for supplying said articles and a pusher unit is mounted for movement transversely of said conveyor for transferring said articles from the conveyor to the supporting surfaces of the movable members.

8. In apparatus as defined in claim 7 in which control means is operatively connected to said pusher unit to actuate said pusher unit upon movement of an article into register with said movable members and to actuate said actuating member after a predetermined number of articles have been transferred to the supporting surfaces of the movable members whereby said articles are stacked onto said support.

9. In apparatus as defined in claim 8 in which a switch element is mounted in position to be engaged by an article as it moves into register with said movable members whereby said control means is actuated to transfer an article from the conveyor to said movable members.

References Cited by the Examiner
UNITED STATES PATENTS

| | | | |
|---|---|---|---|
| 1,551,004 | 8/1925 | Biggert | 214—1 |
| 3,080,069 | 3/1963 | Euwe | 214—6 |
| 3,080,070 | 3/1963 | Euwe | 214—6 |
| 3,212,658 | 10/1965 | Roberts | 214—130 |

GERALD M. FORLENZA, *Primary Examiner.*

J. E. OLDS, *Assistant Examiner.*